(12) United States Patent
Umemura et al.

(10) Patent No.: US 12,719,227 B2
(45) Date of Patent: Aug. 25, 2026

(54) ULTRAVIOLET LASER LIGHT GENERATION DEVICE

(71) Applicants: Nobuhiro Umemura, Chitose (JP); JOSHO GAKUEN EDUCATIONAL FOUNDATION, Osaka (JP); TOSOH SGM CORPORATION, Shunan (JP)

(72) Inventors: Nobuhiro Umemura, Hokkaido (JP); Tomosumi Kamimura, Osaka (JP); Hideharu Horikoshi, Yamaguchi (JP)

(73) Assignees: Nobuhiro Umemura, Hokkaido (JP); Josho Gakuen Educational Foundation, Osaka (JP); Tosoh SGM Corporation, Yamaguchi (JP)

( * ) Notice: Subject to any disclaimer, the term of this patent is extended or adjusted under 35 U.S.C. 154(b) by 477 days.

(21) Appl. No.: 18/547,616

(22) PCT Filed: Feb. 24, 2022

(86) PCT No.: PCT/JP2022/007567
§ 371 (c)(1),
(2) Date: Aug. 23, 2023

(87) PCT Pub. No.: WO2022/181677
PCT Pub. Date: Sep. 1, 2022

(65) Prior Publication Data

US 2024/0131209 A1 Apr. 25, 2024
US 2024/0226348 A9 Jul. 11, 2024

(30) Foreign Application Priority Data

Feb. 24, 2021 (JP) ................................ 2021-027497

(51) Int. Cl.
*G02F 1/35* (2006.01)
*G02F 1/37* (2006.01)
(Continued)

(52) U.S. Cl.
CPC .......... *H01S 3/0092* (2013.01); *G02F 1/3507* (2021.01); *G02F 1/3532* (2013.01);
(Continued)

(58) Field of Classification Search
CPC ...... H01S 3/0092; H01S 3/109; G02F 1/3532; G02F 1/3507; G02F 1/3534; G02F 1/37; G02F 1/39
See application file for complete search history.

(56) References Cited

U.S. PATENT DOCUMENTS 5,144,630 A * 9/1992 Lin .......................... G02F 1/37 372/21
5,828,424 A * 10/1998 Wallenstein ......... H04N 9/3129 348/754

(Continued)

FOREIGN PATENT DOCUMENTS

CN 107425407 12/2017
CN 111404011 7/2020

(Continued)

OTHER PUBLICATIONS

Sakuma, et al., "Generation of all-solid-state, high-power continuous-wave 213-nm light based on sum-frequency mixing in CsLiB6O10", Optics Letters, vol. 29, No. 10, May 15, 2004, pp. 1096-1098.

(Continued)

*Primary Examiner* — James A Menefee
(74) *Attorney, Agent, or Firm* — HSML P.C.

(57) ABSTRACT

The present invention relates to a 399.08-nm wavelength ultraviolet laser light generating device, comprising: an excitation light source part for converting a 1064.2-nm laser light to a second harmonic, and generating a 532.1-nm laser light; an optical parametric oscillating part for generating a 798.15-nm signal light and a 1596.3-nm idler light using the 532.1-nm laser light; a first wavelength converting part for
(Continued)

generating a 399.08-nm light by sum frequency generation of the 1596.3 nm idler light and a 532.1-nm light; and a second wavelength converting part for generating a 399.08-nm light of a second harmonic from the 798.15-nm signal light. The order of the first wavelength converting part and the second wavelength converting part is random. The present invention relates to a 228.04-nm wavelength ultraviolet laser light generating device comprising the 399.08-nm wavelength laser light generating device and a third wavelength converting part for subjecting a 399.08-nm light and a 532.1-nm light to sum frequency generation, and generating a 228.04-nm light. The present invention provides a simple device of generating a 228.04-nm laser light which is a deep ultraviolet ray in high efficiency and a simple 399.08-nm ultraviolet laser light generating device usable as a light source thereof.

6 Claims, 4 Drawing Sheets

(51) Int. Cl.
*G02F 1/39* (2006.01)
*H01S 3/00* (2006.01)
*H01S 3/08* (2023.01)
*H01S 3/109* (2006.01)

(52) U.S. Cl.
CPC .............. *G02F 1/3534* (2013.01); *G02F 1/37* (2013.01); *G02F 1/39* (2013.01); *H01S 3/109* (2013.01); *H01S 3/08004* (2013.01)

(56) References Cited

U.S. PATENT DOCUMENTS 5,894,489 A * 4/1999 Halldorsson ......... H04N 9/3129 348/E9.026
6,219,363 B1 * 4/2001 Fix ............................ G02F 1/39 359/328
6,249,371 B1 6/2001 Masuda et al.
6,477,188 B1 11/2002 Takaoka et al.
6,480,325 B1 * 11/2002 Batchko ................ G02F 1/3532 359/328
2002/0009115 A1 * 1/2002 Sumiyoshi ................ G02F 1/39 372/75
2007/0064749 A1 3/2007 Kaneda et al.
2009/0185583 A1 * 7/2009 Kuksenkov ......... G03F 7/70025 372/5
2012/0026578 A1 2/2012 Sakuma
2014/0009821 A1 * 1/2014 Hodgson ............... H01S 3/0092 359/330
2014/0226140 A1 * 8/2014 Chuang .............. G02B 17/0892 372/22
2016/0116822 A1 4/2016 Kaneda
2020/0271588 A1 * 8/2020 Asahi .................... G01J 3/2803
2024/0131208 A1 * 4/2024 Umemura ................. A61L 2/10

FOREIGN PATENT DOCUMENTS

CN 111725695 A * 9/2020 ............ H01S 3/108
CN 112003118 11/2020
EP 1 482 293 11/2016
JP H06222407 A * 8/1994 ........... G02F 1/3534
JP 7-318997 12/1995
JP 9-292638 11/1997
JP 11-258645 9/1999
JP 2003-114454 4/2003
JP 2007-086104 4/2007
JP 2008-170582 7/2008
JP 2012-252289 12/2012
TW 201531786 8/2015
WO 99/14631 3/1999
WO 2015/174388 11/2015

OTHER PUBLICATIONS

Mirov, et al., "All-solid-state laser system tunable in deep ultraviolet based on sum-frequency generation in CLBO", Optics Communications vol. 198, Nov. 1, 2001, pp. 403-406.
International Search Report issued in International Application No. PCT/JP2022/007567, May 10, 2022, 12 pages w/ translation, 10 pages.
International Preliminary Report on Patentability issued in International Application No. PCT/JP2022/007567, Aug. 29, 2023 w/ translation.
Office Action issued in corresponding Taiwanese Patent Application No. 11110683, filed Jul. 29, 2025, 4 pages.
Petrov, et al., "Frequency Conversion of Ti:Sapphire-Based Femtosecond Laser Systems to the 200-nm Spectral Region Using Nonlinear Optical Crystals", IEEE Journal of Selected Topics in Quantum Electronics, vol. 5, No. 6, Dec. 1, 1999, pp. 1532-1542.
Aadhi A et al: "Single-frequency continuous-wave tunable ultraviolet sources based on BIBO and PPKTP crystals and their comparative studies", International Conference on Optics and Photonics, Proc. of SPIE, vol. 9654, Jun. 15, 2015, pp. 96541G-1-96541G-6.
Aadhi A et al: "All periodically-poled crystals based source of tunable, continuous-wave, single-frequency, ultraviolet radiation", 2015 Conference on Lasers and Electro-Optics (CLEO), OSA, May 10, 2015, pp. 1-2.
Aadhi A et al: "All-periodically poled, high-power, continuous-wave, single-frequency tunable UV source", Optics Letters, Optical Society of America, US, vol. 40, No. 1, Jan. 1, 2015, pp. 33-36.
Extended European Search Report issued in corresponding European Patent Application No. 22759712.7, Mar. 10, 2025, 13 pages.
Office Action issued corresponding Chinese Patent Application No. 202280016813.2, Apr. 29, 2026, 18 pages w/ translation.

* cited by examiner 1064.2 nm
λ/2 plate
1064.2 nm
Crystal 1
KTP
1064.2 nm
M1
532.1 nm
Pump source
OPO Mirror
Crystal 2
Type-1
OPO
BBO
1596.3 nm
(Idler output)
798.15 nm
(Signal output)
532.1 nm
1596.3 nm
+ 532.1 nm
→ 399.08 nm
Crystal 3
Type-2(b)
SFG
BBO
399.08 nm
798.08 nm
532.1 nm
798.15 nm SHG
→ 399.08 nm
Crystal 4
Type-1
SHG
399.08 nm
532.1 nm
+ 399.08 nm
→ 228.04 nm
Crystal 5
BBO
Type-1
SFG
399.08 nm
532.1 nm
228.04 nm
(Separating)

ULTRAVIOLET LASER LIGHT GENERATION DEVICE

TECHNICAL FIELD

The present invention relates to an ultraviolet laser light generating device. More particularly, it relates to a 399.08-nm wavelength laser light generating device and a 228.04-nm wavelength laser light generating device.

CROSS-REFERENCE TO RELATED APPLICATIONS

The present application claims the priority of Japanese Patent Application No. 2021-027497 filed on Feb. 24, 2021, the entire contents of which are herein incorporated by reference.

BACKGROUND ART

A laser light with a wavelength falling within the range of 200 to 280 nm is also referred to as a deep ultraviolet ray, and is used in various fields of a semiconductor exposure device, wafer inspection, a disinfecting device, and the like. As a light source for a deep ultraviolet laser light generating device, mention may be made of an excimer laser or a semiconductor laser. The excimer laser uses a toxic gas, and further, has a disadvantage of requiring a maintenance cost. Further, the semiconductor laser provides a weak output, and is difficult to develop. On the other hand, a laser light generating device using a solid laser oscillator having an oscillation wavelength in a 1-μm band as a basic light source, and including a wavelength conversion element part using a nonlinear crystal, or the like in combination can provide various-wavelengths deep ultraviolet laser lights (PTL 1 and 2). However, the laser light wavelengths obtained by wavelength conversion due to harmonic generation has been limited to a wavelength of a fraction of an integer of the wavelength of the base light source. Further, in order to obtain laser lights with other wavelengths than that, wavelength conversion by an optical parametric oscillator is performed. In that case, the output of any one of a signal light or an idler light is not used, resulting in a defect of low efficiency of the overall system.

Still further, in order to obtain a laser light with a desirable wavelength, a plurality of laser oscillators may be used (PTL 3 and 4). However, the system of two lasers entails a concern about the cost and the reduction of the efficiency.

[PTL 1] Japanese Patent Application Publication No. H09-292638

[PTL 2] Japanese Patent Application Publication No. H11-258645

[PTL 3] Japanese Patent Application Publication No. 2003-114454

[PTL 4] Japanese Patent Application Publication No. 2007-086104

The entire contents of PTL 1 to 4 are incorporated herein as disclosure.

SUMMARY OF INVENTION

Technical Problem

It is a first object of the present invention to provide a laser light generating device of 228.04 nm which is a deep ultraviolet ray never provided in the related art using a single semiconductor laser oscillator. It is a second object of the present invention to provide an ultraviolet laser light generating device of 399.08 nm usable as a light source for a laser light generating device of 228.04 nm which is a deep ultraviolet ray never provided in the related art.

Solution to Problem

The present invention is as follows:

[1]

A 399.08-nm wavelength ultraviolet laser light generating device, comprising:

- an excitation light source part for converting a laser light with a wavelength of 1064.2 nm to a second harmonic, and generating a laser light with a wavelength of 532.1 nm;
- an optical parametric oscillating part for generating a signal light with a wavelength of 798.15 nm and an idler light with a wavelength of 1596.3 nm using the laser light with the wavelength of 532.1 nm generated at the excitation light source part as an excitation light;
- a first wavelength converting part for generating a light with a wavelength of 399.08 nm by sum frequency generation of the idler light with the wavelength of 1596.3 nm and a 532.1-nm light; and
- a second wavelength converting part for generating a light with a wavelength 399.08 nm of a second harmonic from the signal light with the wavelength of 798.15 nm, and
- having optical paths for laser lights in the order of the excitation light source part, the optical parametric oscillating part, the first wavelength converting part, and the second wavelength converting part, or the order of the excitation light source part, the optical parametric oscillating part, the second wavelength converting part, and the first wavelength converting part.

[2]

The device according to [1], in which the 532.1-nm light to be subjected to sum frequency generation at the first wavelength converting part is a 532.1-nm light which has not been converted at the optical parametric oscillating part.

[3]

The device according to [1] or [2], having optical paths for laser lights in the order of the excitation light source part, the optical parametric oscillating part, the first wavelength converting part, and the second wavelength converting part.

[4]

A 228.04-nm wavelength ultraviolet laser light generating device comprising the 399.08-nm wavelength laser light generating device according to any of [1] to [3], and a third wavelength converting part for subjecting a 399.08-nm light and a 532.1-nm light to sum frequency generation, and generating a 228.04-nm light.

[5]

The device according to [4], wherein the 532.1-nm light to be subjected to sum frequency generation at the third wavelength converting part is a 532.1-nm light which has not been converted at the optical parametric oscillating part.

[6]

The device according to [4] or [5], comprising a separating part for separating the 228.04-nm light and lights with other wavelengths at a rear part of the third wavelength converting part.

Advantageous Effects of Invention

The present invention can provide a laser generating device excellent in operability capable of generating a laser light with a wavelength range of 228.04 nm of a deep ultraviolet ray which may be used for disinfection with high efficiency and with ease. The present invention can provide a 399.08-nm ultraviolet laser light generating device usable as a light source for a 228.04-nm laser light generating device.

DESCRIPTION OF EMBODIMENTS

A first aspect of a laser light generating device of the present invention is a 399.08-nm wavelength ultraviolet laser light generating device. The device includes:

an excitation light source part for converting a laser light with a wavelength 1064.2 nm to a second harmonic, and generating a laser light with wavelength of 532.1 nm, an optical parametric oscillating part for generating a signal light with a wavelength of 798.15 nm and an idler light with a wavelength of 1596.3 nm using the laser light with the wavelength 532.1 nm generated at the excitation light source part as an excitation light, a first wavelength converting part for subjecting the idler light with a wavelength of 1596.3 nm and a 532.1-nm light to sum frequency generation, and generating a light with a wavelength of 399.08 nm, and a second wavelength converting part for generating a light with a wavelength of 399.08 nm of a second harmonic from the signal light with a wavelength of 798.15 nm, and has:

optical paths for laser lights in the order of the excitation light source part, the optical parametric oscillating part, the first wavelength converting part, and the second wavelength converting part, or in the order of the excitation light source part, the optical parametric oscillating part, the second wavelength converting part, and the first wavelength converting part.

A second aspect of the laser light generating device of the present invention is a 228.04-nm wavelength ultraviolet laser light generating device. The device includes the 399.08-nm wavelength laser light generating device of the first aspect of the present invention, and a third wavelength converting part for subjecting a 399.08-nm light and a 532.1-nm light to sum frequency generation, and generating a 228.04-nm light.

Figure 1:
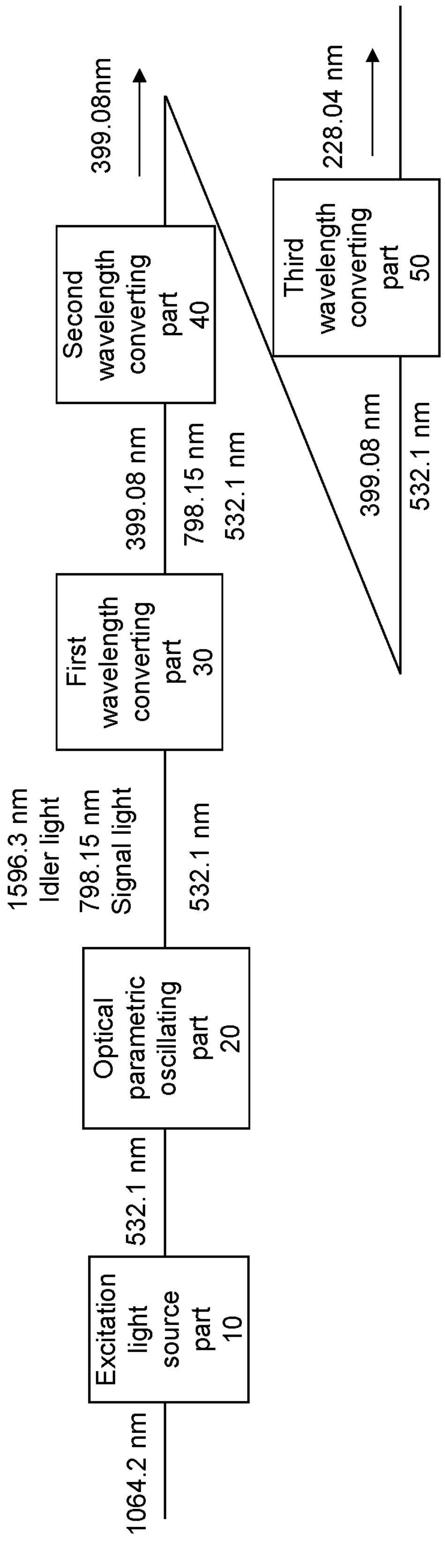
FIG. 1 shows a schematic explanatory view of a laser generating device of the present invention.

FIG. 1 shows a schematic explanatory view of a laser light generating device according to the first and second aspects, and having optical paths for laser lights in the order of the excitation light source part, the optical parametric oscillating part, the first wavelength converting part, and the second wavelength converting part.

The laser light generating device of the first aspect of the present invention is a device including 10 to 40 of FIG. 1. "10" is an excitation light source part, "20" is an optical parametric oscillating part, "30" is a first wavelength converting part, and "40" is a second wavelength converting part. The order of the first wavelength converting part 30 and the second wavelength converting part 40 may be reversed. The laser light generating device of the second aspect of the present invention includes a third wavelength converting part 50 in addition to 10 to 40 of FIG. 1.

Figure 2:
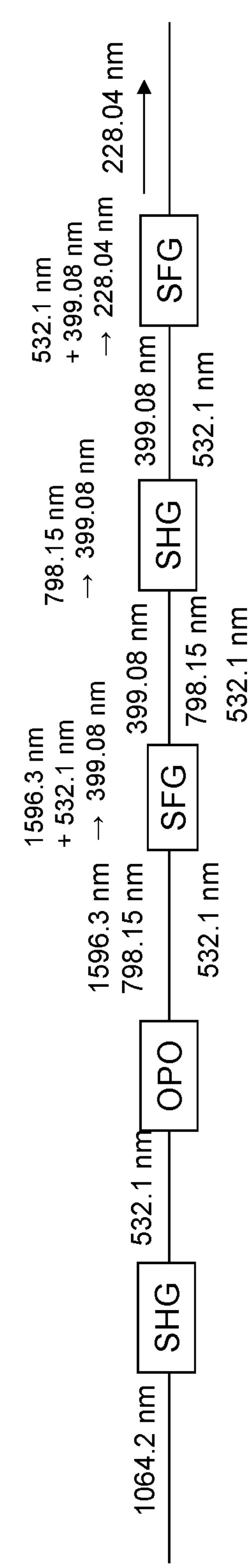
FIG. 2 shows a schematic explanatory view of one embodiment of the laser generating device of the present invention.

FIG. 2 is a schematic explanatory view of one aspect of the laser light generating device of the present invention, and particularly shows that the excitation light source part includes a SHG, the first wavelength converting part 30 includes an SFG, the second wavelength converting part 40 includes a SHG, and the third wavelength converting part 50 includes an SFG.

Figure 3:
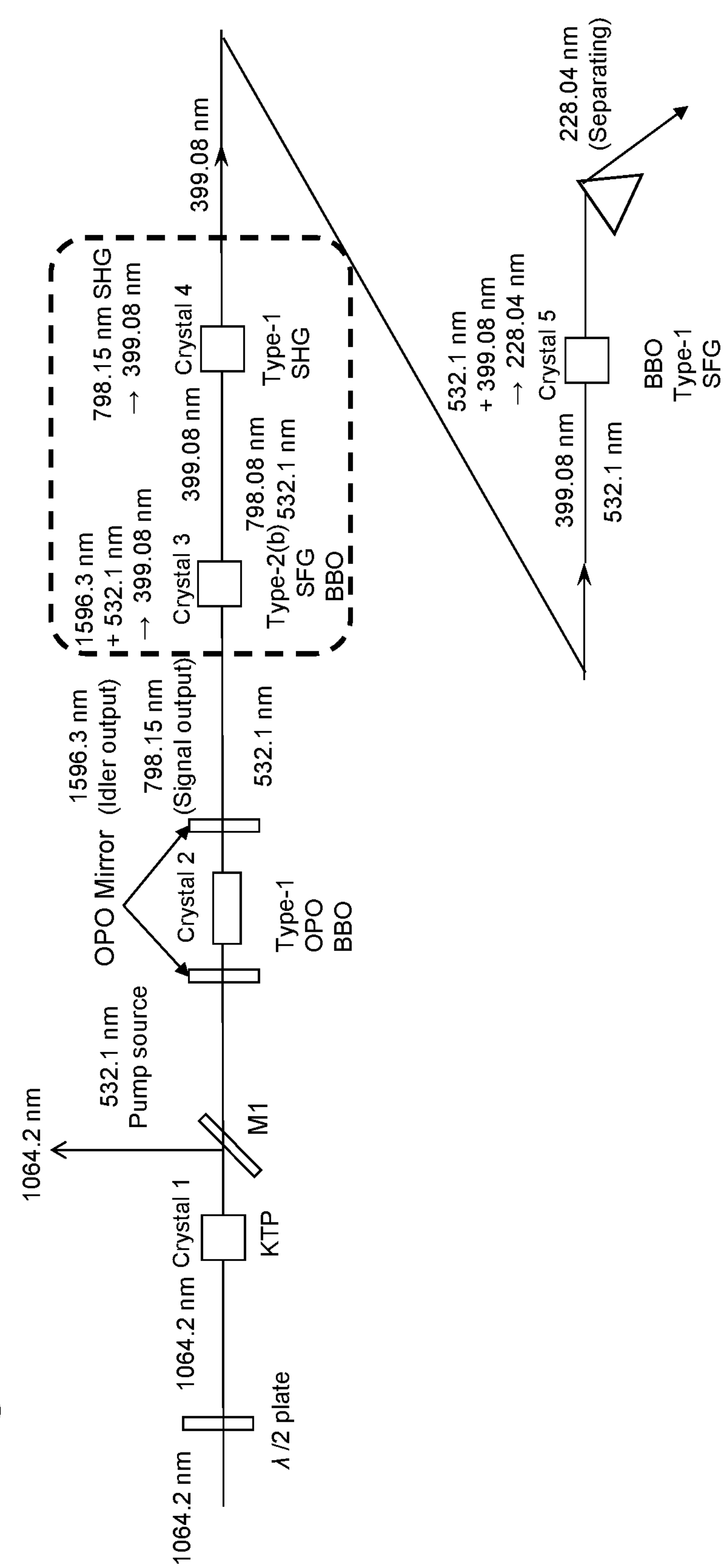
FIG. 3 shows one embodiment of the laser generating device of the present invention.

FIG. 3 shows an explanatory view of one aspect of the laser light generating device of the present invention.

The meaning of the abbreviation in the description of the present application is as follows.

SHG: Second harmonic generation

SFG: Optical sum frequency generation (Sum Frequency Generation)

OPO: Optical parametric oscillating part (optical parametric oscillator)

KTP: $KTiOPO_4$

BBO: $\beta$-$BaB_2O_4$

LBO: $LiB_3O_5$

BiBO: $BiB_3O_6$

MgO: PPLT:MgO-added periodically poled $LiTaO_3$

KBBF: $KBe_2BO_3F_2$ (Description of Excitation Light Source Part)

The excitation light source part 10 is a site for converting a laser light with a wavelength of 1064.2 nm to a second harmonic, and generating a laser light with a wavelength of 532.1 nm. The excitation light source for generating a laser light with a wavelength of 1064.2 nm can be, for example, a Nd:YAG ($Nd_3$+: $Y_3Al_5O_{12}$) laser. The laser light with a wavelength of 1064.2 nm is a pulse laser light, and the time width of the pulse can be in nanosecond or picosecond. The excitation light source part 10 can include, for example, an excitation light source, and a nonlinear optical crystal for converting the laser light to a 532.1-nm laser light of a second harmonic (SHG). The nonlinear optical crystal can be, for example, a KTP crystal, and is indicated with a crystal 1 in FIG. 3. The crystal 1 can also be, for example, any of BBO, LBO, MgO-added MgO:PPLT, and PPKTP other than the KTP crystal. PP of "PP+crystal name" is the abbreviation of "Periodically Poled".

More specifically, when the KTP crystal is used as the nonlinear optical crystal, as shown in FIG. 3, a laser light from the excitation light source is passed through a half-wave plate (λ/2 plate) so that the polarization direction was set at 45 degrees diagonally. Then, the laser light is passed though the crystal 1, thereby to be converted to a 532.1-nm laser light of a second harmonic. The phase matching in wavelength conversion is of the type 2. Whereas, when an LBO or BBO crystal is used for the crystal 1, the polarization direction is made the direction perpendicular to the paper plane though a λ/2 plate. Then, the laser light is passed through the crystal 1, thereby to be converted to a 532.1-nm laser light of a second harmonic.

Further, when MgO:PPLT or PPKTP is used for the crystal 1, a λ/2 plate is not necessary. The crystal 1 is set so that the polarization direction of the 532.1-nm laser light may become the direction in parallel with the paper plane.

The phase matching of the type 2 means phase matching for generating a secondary harmonic from incident lights of different light beams (i.e., different polarized lights orthogonal to each other), and is distinguished from phase matching of the type 1 of generating a secondary harmonic of a different polarized light from the incident light from the incident light of the same light beam (i.e., the same polarized light). Further, the phase matching resulting in that all of the incident light and the second harmonic are in the direction of the same extraordinary ray is referred to as type 0 in the present description.

A list of the kind and the functions, the type of phase matching, and polarization of each crystal usable in the excitation light source part, the optical parametric oscillating part, the first wavelength converting part, the second wavelength converting part, and the third wavelength converting part is shown in Table 1.

TABLE 1

| Wavelength converting part | Crystal | Function | Type of phase matching | Polarization | Usable crystal |
|---|---|---|---|---|---|
| Excitation light part | Crystal 1 | SHG 1064.2 nm → 532.1 nm | Type 0 | e + e → e | MgO:PPLT, PPKTP |
| | | | Type 1 | o + o → e | BBO, LBO |
| | | | Type 2 | e + o → e | KTP |
| Optical parametric oscillating part | Crystal 2 | OPO 532.1 nm → 1596.3 nm + 798.15 nm | Type 0 | e + e → e | MgO:PPLT, PPKTP |
| | | | Type 1 | e → o + o | BBO, BiBO |
| First wavelength converting part | Crystal 3 | SFG 1596.3 nm + 532.1 → 399.08 nm | Type 0 | e + e → e | MgO:PPLT |
| | | | Type 2 | o + e → e | BBO |
| Second wavelength converting part | Crystal 4 | SHG 798.15 nm → 399.08 nm | Type 0 | e + e → e | MgO:PPLT |
| | | | Type 1 | o + o → e | LBO, BBO |
| Third wavelength converting part | Crystal 5 | SFG 532.1 nm + 399.08 nm → 228.04 nm | Type 1 | o + o → e | BBO, KBBF |

"o" in the column of polarization in Table 1 means an ordinary wave, and "e" means an extraordinary wave.

(Dichroic Mirror M1)

A dichroic mirror (M1 in FIG. 3) can be provided between the excitation light source part 10 and the OPO 20. The dichroic mirror M1 can reflect a 1064.2-nm light included in the light from the excitation light source part 10, and can make a 532.1-nm laser light. A 1064.2-nm light is not used in the subsequent processes, and hence is separated from a 532.1-nm laser light. This can avoid the following: when laser with other wavelengths is condensed in subsequent processes, the optical elements are applied with unnecessary damages, and a temperature load is applied to the crystal. A 532.1-nm laser light transmitted through the dichroic mirror M1 is made incident upon the OPO.

(Description of Optical Parametric Oscillating Part (OPO))

The OPO 20 is a site for generating a signal light with a wavelength of 798.15 nm and an idler light with a wavelength of 1596.3 nm using a laser light with a wavelength of 532.1 nm generated at the excitation light source part as an excitation light, and separating the generated signal light. The OPO includes a nonlinear optical crystal and two mirrors. The nonlinear optical crystal can be, for example, a BBO crystal or a BiBO crystal, and mention may be made of any of MgO:PPLT or PPKTP other than these. The crystal 2 is cut to a phase matching angle for generating a signal light $\lambda s$ with a wavelength of 798.15 nm and an idler light $\lambda i$ with a wavelength of 1596.3 nm. MgO:PPLT and PPKTP are adjusted so as to have a polarization reversal period length capable of generating the signal light and idler light wavelengths. The two wavelengths generated from the crystal is amplified by a resonator including two mirrors, resulting in OPO oscillation. For the crystal 2 constituting the optical parametric oscillating part 20, as shown in Table 1, when phase matching is the process of type 1, assuming that the excitation light is a polarized light in horizontal with the paper plane, the signal light and the idler light are polarized in the direction perpendicular to the paper plane.

Desirably, the wavelength precision of the signal light of the optical parametric oscillating part 20 is narrowed in band with a seed light by a semiconductor laser, and the crystal 2 is controlled to about 0.1 nm or less by temperature tuning. As a result of this, the spectrum width and the variation amount of a 399.08-nm purple light wavelength can be set at about 0.05 nm or less.

(First Wavelength Converting Part 30)

The first wavelength converting part 30 is a site for generating a light with a wavelength of 399.08 nm by optical sum frequency mixing from an idler light with a wavelength of 1596.3 nm generated at the OPO and a light with a wavelength 532.1 nm which has been transmitted through the OPO, and generated at the excitation light source part. The 532.1-nm light to be subjected to sum frequency generation at the first wavelength converting part 30 is the 532.1-nm light which has not been converted at the OPO20. For the crystal 3 shown in FIG. 3, for example, a nonlinear optical crystal such as a BBO crystal can be used. When MgO:PPLT is used other than BBO for the crystal 3, MgO:PPLT is used as the crystal 2 of the optical parametric oscillating part 20. In that case, the crystal 3 is adjusted to a polarization reversal period length for generating optical sum frequency of a wavelength of 532.1 nm with an idler light with a wavelength of 1596.3 nm. The polarization direction of the 399.08-nm light at this step is the direction horizontal with the paper plane.

(Second Wavelength Converting Part 40)

The second wavelength converting part 40 is a SHG site of from a signal light with a wavelength of 798.15 nm to a wavelength of 399.08 nm. For the crystal 4 shown in FIG. 3, for example, a nonlinear optical crystal such as LBO or a BBO crystal can be used. The crystal 4 can be, for example, a nonlinear optical crystal such as MgO:PPLT other than LBO or BBO. When the crystal 4 is MgO:PPLT, as the crystal 2 of the optical parametric oscillating part 20, MgO: PPLT is used. In that case, the crystal 4 is adjusted to a polarization reversal period length for generating SHG with a wavelength of 798.15 nm. Also at this step, the polarization direction of the 399.08-nm light is the direction horizontal with the paper plane.

The order of the first wavelength converting part 30 and the second wavelength converting part 40 can be interchanged. Namely, the 399.08-nm wavelength ultraviolet laser light generating device (first aspect) of the present invention can have optical paths for laser lights in the order of the excitation light source part 10, the optical parametric oscillating part 20, the first wavelength converting part 30, and the second wavelength converting part 40, or in the order of the excitation light source part 10, the optical parametric oscillating part 20, the second wavelength converting part 40, and the first wavelength converting part 30.

The order of the first wavelength converting part 30 and the second wavelength converting part 40 can be interchanged.

(Third Wavelength Converting Part 50)

The third wavelength converting part 50 is a site for generating a 228.04-nm light by optical sum frequency mixing from a light with a wavelength of 532.1 nm generated at the excitation light source part transmitted through the OPO 20, the first wavelength converting part 30, and the second wavelength converting part 40, and a light with a wavelength of 399.08 nm generated at the first wavelength converting part 30 and the second wavelength converting part 40. The 532.1-nm light to be subjected to sum frequency generation at the third wavelength converting part 50 is a 532.1-nm light not converted at the OPO 20, and transmitted through the first wavelength converting part 30 and the second wavelength converting part 40. For the crystal 5 shown in FIG. 3, for example, a nonlinear optical crystal such as a BBO or KBBF crystal can be used.

(Separating Part 60)

The rear part of the third wavelength converting part 50 can be provided with a separating part 60 (not shown in FIGS. 1 and 2) for separating laser lights with various wavelengths generated during the process of wavelength conversion, and extracting a 228.04-nm light. The separating part 60 can be, for example, a prism (see FIG. 3). The prism has no particular restriction so long as it can remove laser lights with wavelengths other than 228.04 nm generated in the process of wavelength conversion, and can be, for example, a quartz prism, or a $MgF_2$ prism. At the separating part 60, lights with wavelengths other than 228.04 nm are separated, resulting in a laser light with a wavelength of 228.04 nm.

The example shown in FIG. 3 is the case where the optical parametric oscillating part is for type-1 phase matching. When the optical parametric oscillating part is for type-0 phase matching, as the crystal 3 and the crystal 4, MgO: PPLT is used in both cases. However, the examples are merely illustrative, and it is not intended that the present invention is limited to the examples.

(Generation Mechanism of 228.04-Nm Wavelength Laser Light)

At the OPO, the following relationship holds, where λp represents the excitation light wavelength, λs represents the signal light wavelength λs, and λi represents the idler light wavelength.

$$1/\lambda s+1/\lambda i=1/\lambda p \quad \text{(Math. 1)}$$

Further, the SFG has the following relationship, where $\lambda_1$ represents the incident light wavelength, $\lambda_2$ represents another incident light wavelength, and $\lambda_3$ represents the optical sum frequency wavelength.

$$1/\lambda_1+1/\lambda_2=1/\lambda_3 \quad \text{(Math. 2)}$$

With the ultraviolet ray laser generating system due to wavelength conversion, there are various combinations using (Math. 1) and (Math. 2), and the foregoing relationships generate a coherent light with a desirable wavelength. Normally, the output light of any one of the signal light or the idler light of (Math. 1) is used for wavelength conversion, resulting in generation of a deep ultraviolet laser light. Another output light is not used, and is cut by a filter. This resulted in a disadvantage of low conversion efficiency to a deep ultraviolet ray of the overall system.

Figure 4:
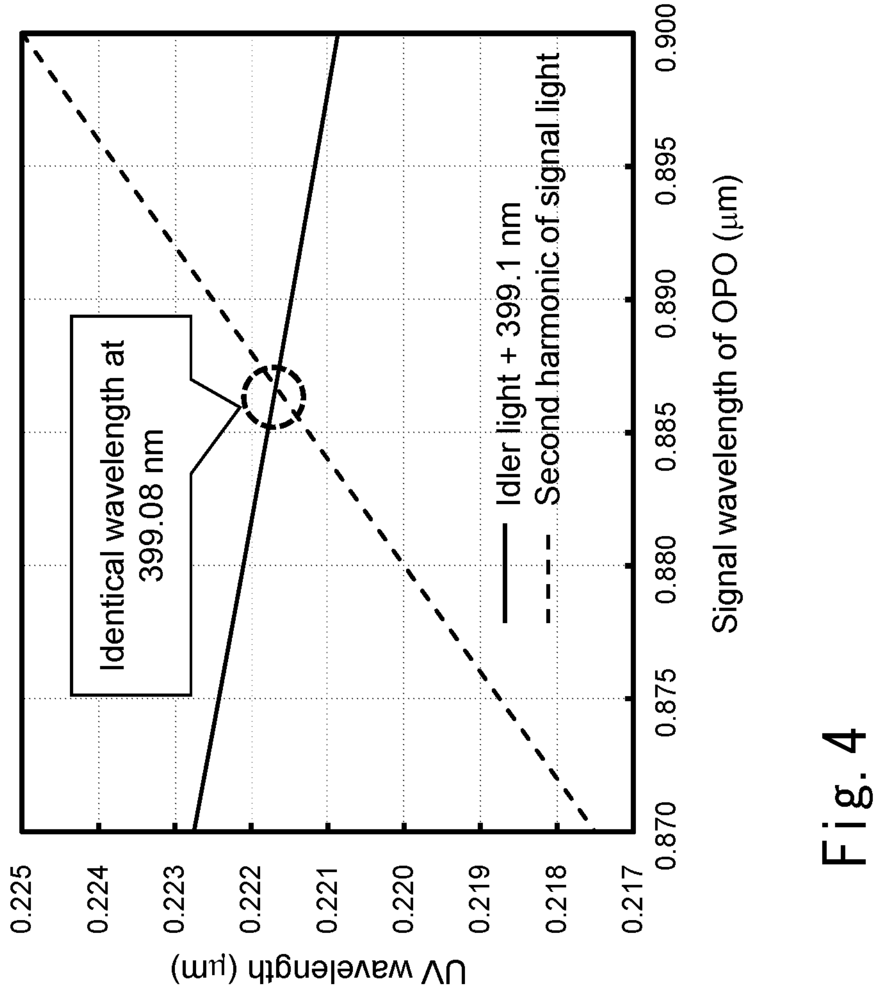
FIG. 4 shows an explanatory view indicating that the wavelength of optical sum frequency generation of an idler light λi with a wavelength of 1596.3 nm generated at the OPO and a 532.1-nm light of an excitation light is 399.08 nm, and is in agreement with a 399.08-nm light of a second harmonic of a signal light λs with a wavelength of 798.15 nm generated at the same OPO.

In the present invention, as described above, at the OPO of excitation of 532.1 nm of a second harmonic of a 1064.2-nm laser light, a 798.15-nm signal light λs and an idler light λi with a wavelength of 1596.3 nm are generated. The wavelength of optical sum frequency generation generated from the idler light λi with a wavelength of 1596.3 nm and a 532.1-nm light of the excitation light at the first wavelength converting part is 399.08 nm. The characteristic that the wavelength is in agreement with a wavelength of 399.08 nm of a second harmonic generated from the 798.15-nm signal light λs generated at the second wavelength converting part is used (see FIG. 4). For this reason, it is possible to implement a more efficient 399.08-nm wavelength ultraviolet laser light generating device.

In addition, in the present invention, the output lights of both of the signal light and the idler light of the OPO can be used for generating an ultraviolet light with a wavelength of 399.08 nm. Further, optical sum frequency generation generated from the light with a wavelength of 399.08 nm and a 532.1-nm light of the excitation light enables generation of a deep ultraviolet light with a wavelength of 228.04 nm. For this reason, it is possible to implement a more efficient 228.04-nm wavelength deep ultraviolet laser light generating device.

The laser light with a wavelength of 399.08 nm obtainable with the device of the present invention can also be used as a light source for other wavelengths in combination with a nonlinear crystal, or the like.

The laser light with a wavelength of 228.04 nm obtainable with the device of the present invention approximates to a wavelength of 222 nm, and hence is considered to also have a disinfection effect.

With the laser light generating device of the present invention, both the signal light and the idler light can be used. This enables more efficient generation of a deep ultraviolet laser light. This enables application of an ultraviolet ray with a wavelength of 399.08 nm or 228.04 nm to a wide region, and application to a liquid such as water, which is available for uses of disinfection of the gateway of a facility where unspecified people enter and exit, and a liquid, and the like. Additionally, the generated laser light can be applied to the object via a laser light conductor such as a fiber, if required. Therefore, for example, application of ultraviolet rays to the portion such as the rear side of a structure becomes easy.

INDUSTRIAL APPLICABILITY

The present invention is effective certainly in the medical scene, and also in disinfection work in a large scale facility. Further, a toxic gas such as ethylene oxide including ozone is not used because of less effect on the human body, and hence the effect on the human body is less and handling is easy. Furthermore, a liquid for alcohol disinfection or the like is not used, and hence the present invention is also usable for disinfection of the paper media not to be wetted with water such as books.

REFERENCE SIGNS LIST

10 Excitation light source part
20 Optical parametric oscillating part
30 First wavelength converting part
40 Second wavelength converting part
50 Third wavelength converting part

The invention claimed is:

1. A 399.08-nm wavelength ultraviolet laser light generating device, comprising:

an excitation light source part for converting a laser light with a wavelength of 1064.2 nm to a second harmonic, and generating a laser light with a wavelength of 532.1 nm;

an optical parametric oscillating part for generating a signal light with a wavelength of 798.15 nm and an idler light with a wavelength of 1596.3 nm using the laser light with the wavelength of 532.1 nm generated at the excitation light source part as an excitation light;

a first wavelength converting part for generating a light with a wavelength of 399.08 nm by sum frequency generation of the idler light with the wavelength of 1596.3 nm and a 532.1-nm light; and a second wavelength converting part for generating a light with a wavelength 399.08 nm of a second harmonic from the signal light with the wavelength of 798.15 nm, and having optical paths for laser lights in the order of the excitation light source part, the optical parametric oscillating part, the first wavelength converting part, and the second wavelength converting part, or the order of the excitation light source part, the optical parametric oscillating part, the second wavelength converting part, and the first wavelength converting part.

2. The device according to claim 1, wherein the 532.1-nm light to be subjected to sum frequency generation at the first wavelength converting part is a 532.1-nm light which has not been converted at the optical parametric oscillating part.

3. The device according to claim 1, having optical paths for laser lights in the order of the excitation light source part, the optical parametric oscillating part, the first wavelength converting part, and the second wavelength converting part.

4. A 228.04-nm wavelength ultraviolet laser light generating device comprising the 399.08-nm wavelength laser light generating device according to claim 1, and a third wavelength converting part for subjecting a 399.08-nm light and a 532.1-nm light to sum frequency generation, and generating a 228.04-nm light.

5. The device according to claim 4, wherein the 532.1-nm light to be subjected to sum frequency generation at the third wavelength converting part is a 532.1-nm light which has not been converted at the optical parametric oscillating part.

6. The device according to claim 4, comprising a separating part for separating the 228.04-nm light and lights with other wavelengths at a rear part of the third wavelength converting part.

* * * * *